April 7, 1942.   N. B. LEO   2,278,619
LIQUID HEATER
Filed June 21, 1940

Inventor:
Norton B. Leo, Deceased
By Charlotte E. Leo, Administratrix

Attorneys.

Patented Apr. 7, 1942

2,278,619

UNITED STATES PATENT OFFICE 2,278,619

LIQUID HEATER

Norton B. Leo, deceased, late of Yonkers, N. Y., by Charlotte E. Leo, administratrix, Tuckahoe, N. Y., assignor to Heat-Pump Corporation, New York, N. Y.

Application June 21, 1940, Serial No. 341,764

19 Claims. (Cl. 126—350)

This invention relates to liquid heaters, more particularly of the urn type, for supplying hot water in restaurants.

It is desirable that the water drawn off from such urns be very hot, and that a sudden large demand for hot water not exhaust the supply. This necessity can be met by constantly maintaining at high heat a large body of water, but this is uneconomical because of the considerable amount of heat required.

With the present invention, a body of highly heated water is available at all times, and the apparatus is capacitated to deliver highly heated water for a considerable time. This result is obtained without the consumption of excess fuel.

A preferred embodiment of the invention is disclosed in the accompanying drawing, in which—

Figure 1:
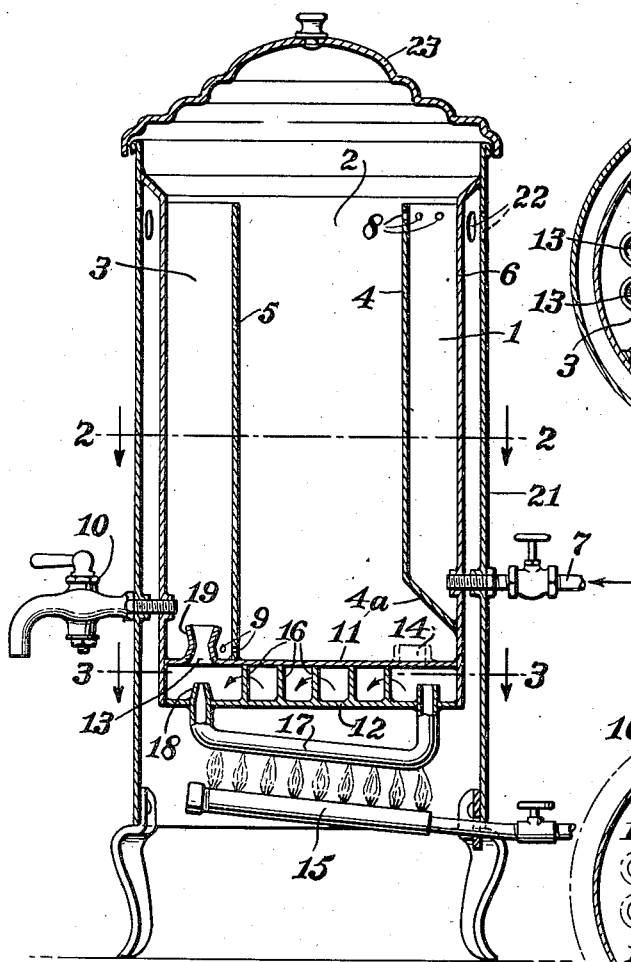
Figure 1 is a transverse vertical section through the apparatus.
Figure 2:
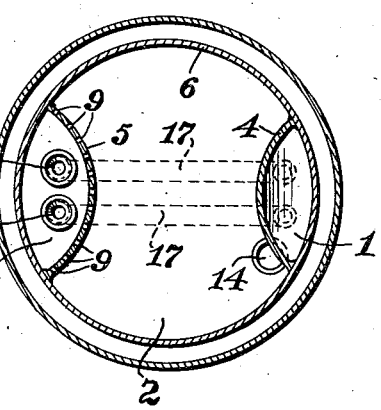
Fig. 2 is a section on the line 2—2 of Figure 1.

The water to be heated, generally considered, is maintained in three stages, and for this reason three chambers, namely, a receiving chamber 1, a main chamber 2, and a draw-off chamber 3, are provided. In the apparatus disclosed, these chambers are formed by partitions 4 and 5 within a tank 6, here shown to be of cylindrical shape. The receiving chamber 1 is separated from the main chamber 2 by partition 4 and the lower portion 4a of this partition preferably slopes toward the wall of tank 6, so that the chamber 1 is formed as an elevated side pocket within the tank.

Admission of the water to be heated is through the valve controlled pipe 7, and this pipe 7 should enter chamber 1 near the bottom thereof. At the top of partition 4 are a plurality of openings 8 for the flow of water from chamber 1 into chamber 2. By this provision, the cool water which enters chamber 1 forces upwardly and over into chamber 2 the water which has been preheated in chamber 1. The cool incoming water does not, therefore, immediately mix with the water already in the tank.

The draw-off chamber 3 is separated from the main chamber 2 by partition 5, and near the bottom of this partition are formed a plurality of openings 9 through which liquid may flow between chambers 2 and 3 so that their liquid levels may equalize. Extending into chamber 3 is a draw-off cock 10 through which the heated water in chamber 3 is delivered for use.

The tank is formed with two spaced apart bottom walls 11 and 12. The space between these walls 11 and 12 communicates with chamber 3 through openings 13, 13, and communicates with chamber 2 through an opening 14. Due to the slope of partition 4a, the opening 14 can be placed nearer the side wall of tank 6 opposite from the openings 13. The bottom wall 12 is exposed to the heat from the burner 15 therebeneath.

Figure 3:
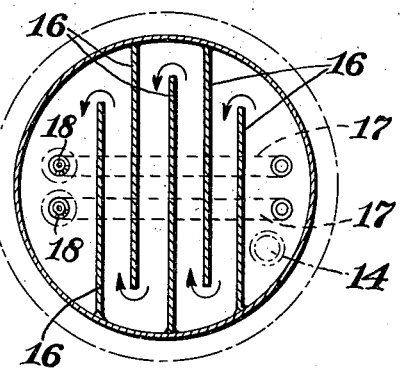
Fig. 3 is a section on the line 3—3 of Figure 1.

To cause the water to flow in a circuitous stream over the bottom wall 12, a series of upright baffles 16 are disposed between walls 11 and 12. As is best shown in Fig. 3, alternate ones of these baffles 16 extend to one side of, but terminate short of, the opposite side of the tank, and thereby form a passageway which causes the water to flow in a confined stream over substantially the entire bottom wall 12. As appears in Fig. 3, the opening 14 is located to one side so as to be at the beginning end of the passageway so formed. The increased contact between the water and the heated wall 12, due to its circuitous flow thereover, serves to elevate the water to a higher temperature.

Preferably the partitions 16 are formed integrally with the bottom wall 12, so that the partitions will be heated by conduction from the bottom wall. The heat which the partitions 16 thereby receive serves to further raise the temperature of the water passing between them.

A pair of conduits 17 are secured to the lower plate 12 and have the major portion of their lengths disposed directly in the flame of the burner 15. At one of their ends the conduits 17 enter the space between the plates 11 and 12 adjacent the opening 14 from this space into the main chamber 2. At their other ends the conduits open into the space between the plates 11 and 12 directly below the openings 13 which provide a communication between this space and the draw-off chamber 3. These ends of the conduits 17 which are below the openings 13, preferably are slightly restricted, so that they are of a nozzle shape, as shown at 18.

As a feature of the invention, Venturi portions 19 are secured to plate 11 above the opening 13, so that the liquid which issues from the nozzles 18 will be directed upwardly through these Venturi portions 19. Since the central portions of the conduits 17 are disposed directly in the flame of the burner, and are inclined upwardly toward their nozzle ends, the liquid which is contained in them will be highly heated, and will issue from the nozzles 18 at a high velocity. The rapid streams which are thereby created through the Venturi portions 19 will draw through the Venturi portions 19 some of the liquid which is about the nozzles, and this, in turn, will draw liquid through the passageway formed by baffles 16.

The nozzles 18 and the Venturi portions 19 thus serve as an ejector to deliver into the chamber 3 not only the liquid from conduits 17, but the liquid which is in the space between the plates 11 and 12 as well. Due to this ejector effect, the liquid between plates 11 and 12 is kept in rapid motion, and the tendency of the baffles 16 to slow up the flow of liquid over the bottom wall 12 is overcome. The liquid will, in fact, be drawn so rapidly over the bottom wall 12 that vapors or sediment tending to collect thereon will be carried away, and the liquid will thereby come in direct contact with this heated surface.

Surrounding the tank 6 is a casing 21 which serves as a support for both the burner 15 and the tank. Preferably the casing 21 is spaced from the tank wall, so that the hot air which passes upwardly from the flame will surround the tank 6 and maintain its contents in a heated condition by overcoming radiation losses. The hot air may escape through openings 22 at the top of the casing 21. A cover 23 should be provided to rest upon the upper edge of the casing 21.

In the operation of the urn, cold water will be admitted through the inlet pipe 7 until the tank 6 is nearly full of water. The burner 15 will then be turned on, and due to the ejector action of the nozzles 18 and Venturi portions 19, water will be drawn from the main chamber 2 and be forced into the draw-off chamber 3. This hot water which is forced in chamber 3 will rise to the top thereof, and the relatively cooler water in chamber 3 will be forced downwardly and through openings 9 into the main chamber 2. When the water in chamber 3 is entirely at the high temperature desired, the burner 15 may be turned to a low heat. Under these conditions, the highly heated water will remain in chamber 3, because, due to the fact that the openings 9 into the main chamber are near the bottom of the tank, there will be no possibility of circulation between the chambers 2 and 3.

When the valve 10 is opened, the hot liquid in chamber 3 will mainly be drawn off because the openings 9 provide such a restricted passageway that only a slight amount of the relatively cooler water in chamber 2 will pass into the chamber 3 and escape through valve 10. Likewise the passageways offered by the conduits 17 and the space between the plates 11 and 12 will not permit the flow of any considerable amount of water from the chamber 2 into the chamber 3. Because of this, it is possible to withdraw nearly the entire highly heated liquid contents of the chamber 3, without drawing off any material amount of the relatively cooler liquid in the chamber 2.

If it is desired, however, to draw off a considerable amount of hot water, the flame 15 may be turned on, and due to the ejector action of the nozzles 18 and Venturi portions 19, water will be drawn from the main chamber 2 and be delivered at high heat into the chamber 3. The capacity of the conduits 17 and the space between the plates 11 and 12 should be such that they will supply highly heated water into the chamber 3 as fast as it may be drawn off through the valve 10. The entire contents of chambers 2 and 3 may be thus delivered at a high temperature.

Since the only means of escape of the liquid in the receiving chamber 1 into the main chamber 2 is through openings 8, the water in the chamber 1 will remain there and become preheated due to the heat it receives from the main body 2, and from the hot air which is outside of its portion of the tank wall 6. After the liquid level in the chambers 2 and 3 has been lowered so that additional water should be supplied to them, the valve in the pipe 7 should be turned on. Since the cold water which is admitted in this manner enters the bottom of the chamber 1, it will force upwardly the warm water which is already in the chamber 1, and cause it to pass through the openings 8 into the chamber 2. Because of the preheated condition of the water so entering chamber 2 from chamber 1, it will not have a material cooling effect upon the water in chamber 2. The cold water which is admitted to the tank will remain in the chamber 1, where it will become preheated before being delivered to the chamber 2 by the next supply of cold water.

Due to the provision of the separate chambers 1, 2, and 3, it is therefore impossible for the cold entering water to mix with and cool the main body of water, and it is nearly impossible for the main body of water to be delivered through the draw-off valve 10 and lower the temperature of this water which is drawn off. It is possible to maintain in the draw-off chamber 3 an adequate supply of highly heated water, and even though the burner is turned relatively low after this highly heated water has been acquired in chamber 3, there will be practically no circulation between the water in the chambers 2 and 3, and the highly heated water will remain in chamber 3 so as to be instantly available for use. Since the valve 10 enters chamber 3, and this is above the space between the bottom walls, the hot liquid in the chamber 3 will tend to first flow out through valve 10, so that the liquid between the bottom walls, which may be relatively cooler, will not be delivered.

The structure involving the nozzles 18 and Venturi portions 19 to obtain a stimulated circulation is not here claimed broadly, since this ejector feature is the basis of Patent 1,960,849, issued to applicant on May 29, 1934.

What is claimed is:

1. A liquid heater comprising a main compartment and a draw-off compartment having a communication between them to permit equalization of their liquid levels, means forming a passageway between the compartments which may be subjected to high heat, means forming another passageway between the compartments which may be subjected to less heat, and means for combining the streams from the passageways with an ejector action so that the highly heated stream stimulates circulation of the lesser heated stream and delivers the combined streams into the draw-off compartment.

2. A liquid heater comprising a main compartment and a draw-off compartment having a communication between them at their lower portions to permit equalization of their liquid levels, means forming a passageway between the compartments which may be subjected to high heat, means forming another passageway between the compartments which may be subjected to less heat, and means for combining the streams from the passageways with an ejector action so that the highly heated stream stimulates circulation of the lesser heated stream and delivers the combined streams into the draw-off compartment.

3. A liquid heater comprising a main compartment and a draw-off compartment having a communication between them to permit equalization of their liquid levels, means forming a passageway between the compartments which may be subjected to high heat, means forming another passageway between the compartments of relatively longer length and which may be subjected to less heat, and means for combining the streams from the passageways with an ejector action so that the highly heated stream stimulates circulation of the lesser heated stream and delivers the combined streams into the draw-off compartment.

4. A liquid heater comprising a main compartment and a draw-off compartment having a communication between them to permit equalization of their liquid levels, means forming a passageway between the compartments of relatively small size, and which may be subjected to high heat, means forming another passageway between the compartments of relatively larger size, and which may be moderately heated, and means for combining the streams from the passageways with an ejector action so that the highly heated small stream stimulates circulation of the moderately heated large stream and delivers the combined streams into the draw-off compartment.

5. A liquid heater comprising a main compartment and a draw-off compartment having a communication between them to permit equalization of their liquid levels, means forming a passageway between the compartments which may be subjected to high heat, means forming another passageway between the compartments of circuitous formation and which may be subjected to heat, and means for combining the streams from the passageways with an ejector action so that the highly heated stream stimulates circulation through the circuitous passageway to overcome the frictional resistance it offers to the flow of liquid.

6. A liquid heater comprising a main compartment and a draw-off compartment having a communication between them to permit equalization of their liquid levels, means forming a passageway between the compartments which may be subjected to heat and which includes a Venturi portion at its point of communication with the draw-off chamber, and means forming another passageway between the compartments which may be subjected to high heat and which includes a nozzle at one end disposed to direct its stream of liquid through said Venturi portion to thereby create an ejector effect into the draw-off compartment.

7. A liquid heater comprising a main chamber for holding a main body of water, a draw-off chamber from which heated water is to be delivered, said chambers having a communication between them whereby their liquid levels may be equalized, a heat receiving conduit forming a liquid passageway between the chambers, a second heat receiving conduit forming another passageway between the chambers, and means including an ejector for combining the liquids from said conduits so that one stimulates flow through the other and delivers the combined liquids into the draw-off chamber.

8. A liquid heater comprising a main chamber for holding a main body of water, a draw-off chamber from which heated water is to be delivered, said chambers having a communication between them whereby their liquid levels may be equalized, a heat receiving conduit forming a liquid passageway between the chambers, a second heat receiving conduit forming another passageway between the chambers, and means including an ejector for combining the liquids from said conduits so that the one stimulates flow through the other and delivers the combined liquids into the draw-off chamber, said second conduit being disposed below the first conduit and being open on all sides to thereby become highly heated.

9. A liquid heater comprising a tank having two spaced apart bottom walls, and a vertical partition within the tank forming a main compartment and a draw-off compartment therein, said compartments having a communication between them so that their liquid levels may equalize, there being an opening from each of the compartments into the space between the bottom walls whereby the liquid may flow from one compartment to the other, and a pipe outside of the tank to be subjected to high heat, said pipe receiving liquid from the tank in a region near the main compartment and delivering it into the tank at the opening between the draw-off compartment and the space between the bottom walls whereby the highly heated liquid from the pipe creates an ejector action to draw fluid through the space between the bottom walls and deliver it into the draw-off compartment.

10. A liquid heater comprising a tank having two spaced apart bottom walls, and a vertical partition within the tank forming a main compartment and a draw-off compartment therein, said compartments having a communication between them so that their liquid levels may equalize, there being an opening from each of the compartments into the space between the bottom walls whereby the liquid may flow from one compartment to the other, and a pipe outside of the tank to be subjected to high heat, said pipe receiving liquid from the tank in a region near the main compartment and delivering it into the tank at the opening between the draw-off compartment and the space between the bottom walls whereby the highly heated liquid from the pipe creates an ejector action to draw fluid through the space between the bottom walls and deliver it into the draw-off compartment, and upright baffles within the space between the bottom walls to cause the liquid to flow in a circuitous stream between the bottom walls.

11. A liquid heater comprising a tank having two spaced apart bottom walls, and a vertical partition within the tank forming a main compartment and a draw-off compartment therein, said compartments having a communication between them so that their liquid levels may equalize, there being an opening from each of the compartments into the space between the bottom walls whereby the liquid may flow from one compartment to the other, and a pipe immediately below the bottom of the tank to be subjected to high heat, said pipe receiving liquid from the tank in a region near the main compartment and delivering it into the tank at the opening between the draw-off compartment and the space between the bottom walls whereby the highly heated liquid from the pipe creates an ejector action to draw fluid through the space between the bottom walls and deliver it into the draw-off compartment.

12. A liquid heater comprising a tank made up of side walls, two spaced apart bottom walls, and a vertical partition within the tank forming a main compartment and a draw-off compartment therein, said partition having a port therethrough near its lower edge to provide a communication between the compartments, there being an opening from each of the compartments into the space between the bottom walls, said openings being at substantially opposite extremities of said space so that the liquid in passing from one compartment to another must flow over the entire lowermost bottom wall, and a pipe immediately below the lowermost bottom wall and entering at its ends into the space between the bottom walls respectively near one of said openings, the end of the pipe which is near the openings into the draw-off compartment being of nozzle formation to direct a rapid stream through the opening and thereby draw liquid through the space between the bottom walls and deliver it into the draw-off compartment.

13. A liquid heater comprising a tank made up of side walls, two spaced apart bottom walls, and a vertical partition within the tank forming a main compartment and a draw-off compartment therein, said partition having a port therethrough near its lower end to provide a communication between the compartments, there being an opening from each of the compartments into the space between the bottom walls, said openings being at substantially opposite extremities of said space so that the liquid in passing from one compartment to another must flow over the entire lowermost bottom wall, and a pipe immediately below the lowermost bottom wall and entering at its ends into the space between the bottom walls respectively near one of said openings, the end of the pipe which is near the openings into the draw-off compartment being of nozzle formation to direct a rapid stream through the opening and thereby draw liquid through the space between the bottom walls and deliver it into the draw-off compartment, said opening into the draw-off compartment being provided with Venturi portions to create an ejector effect upon the liquid between the bottom walls.

14. A liquid heater comprising a receiving compartment and a main compartment, means for delivering fresh water to the lower portion of the receiving compartment, and means for withdrawing the heated liquid from the main compartment, the receiving compartment and the main compartment being divided from each other at their lower portions and being in communication with each other only at their upper portions whereby the fresh entering water will not mix with the contents of the main chamber, and will force the preheated contents of the receiving chamber into the main chamber.

15. A liquid heater comprising a tank having a vertical partition therein forming a receiving compartment and a main compartment, the compartments being divided from each other at their lower portions and being in communication with each other only at the upper part of the partition, and means for delivering fresh water to the lower portion of the receiving chamber whereby the fresh entering water will force the preheated contents of the receiving chamber upwardly and over into the main chamber, the fresh entering water remaining in the receiving chamber.

16. A liquid heater comprising a main compartment and a draw-off compartment having a communication between them to permit equalization of their liquid levels, means forming a passageway from the main compartment to the draw-off compartment, and which is located below the compartments, to be exposed to heat so that the liquid entering the draw-off chamber will be highly heated, and means entering the draw-off chamber at a point above its lower end for withdrawing the heated liquid from the draw-off chamber at a point above the passageway forming means so that the liquid in the passageway will not be withdrawn first.

17. A liquid heater comprising a main compartment and a draw-off compartment having a communication between them to permit liquid to flow from the one to the other, means forming a passageway between the compartments and which may be subjected to heat to raise the temperature of the liquid flowing therethrough, a conduit which may be subjected to high heat, said conduit receiving liquid from the heater and delivering it into the draw-off compartment, and ejector means for combining the streams from said conduit and from said passageway forming means to cause a stimulated flow of liquid through said passageway forming means from the main compartment into the draw-off compartment.

18. A liquid heater comprising a main chamber for holding the main body of water, a draw-off chamber from which heated water is to be delivered, said chambers having a communication between them to permit liquid to flow from the one to the other, a heat receiving conduit forming a liquid passageway between the chambers, a second heat receiving conduit forming another passageway between the chambers, and means including an ejector for combining the liquids from said conduits so that the one stimulates flow through the other and delivers the combined liquids into the draw-off chamber.

19. A liquid heater comprising a tank, a vertical partition within the tank and to one side thereof forming a draw-off chamber of limited size, another vertical partition within the tank spaced remotely from the first partition to form a liquid receiving chamber of limited size, said chambers thereby being separated from each other by a main chamber within the tank, means for withdrawing liquid from the main chamber so that it may be heated and delivered into the draw-off chamber, valved means for withdrawing heated liquid from the draw-off chamber, and valved means for supplying a fresh liquid to the receiving chamber.

CHARLOTTE E. LEO,
*Administratrix of the Estate of Norton B. Leo, Deceased.*